United States Patent
Harris et al.

(10) Patent No.: US 8,607,347 B2
(45) Date of Patent: Dec. 10, 2013

(54) NETWORK STREAM SCANNING FACILITY

(75) Inventors: Mark D. Harris, Banbury (GB); Andrew J. Thomas, Long Wittenham (GB); Mario Magdic, Warborough (GB); James I. G. Lyne, Charlbury (GB)

(73) Assignee: Sophos Limited, Abingdon (GB)

( * ) Notice: Subject to any disclaimer, the term of this patent is extended or adjusted under 35 U.S.C. 154(b) by 1066 days.

(21) Appl. No.: 12/239,867

(22) Filed: Sep. 29, 2008

(65) Prior Publication Data

US 2010/0083380 A1 Apr. 1, 2010

(51) Int. Cl.
*H04L 29/06* (2006.01)
*H04L 9/28* (2006.01)

(52) U.S. Cl.
USPC ............. 726/24; 713/179; 713/187; 713/188

(58) Field of Classification Search
None
See application file for complete search history.

(56) References Cited

U.S. PATENT DOCUMENTS

| | | | | |
|---|---|---|---|---|
| 5,905,800 | A * | 5/1999 | Moskowitz et al. | 380/28 |
| 6,948,066 | B2 * | 9/2005 | Hind et al. | 713/168 |
| 7,007,166 | B1 * | 2/2006 | Moskowitz et al. | 713/176 |
| 7,028,184 | B2 * | 4/2006 | Hind et al. | 713/170 |
| 7,185,368 | B2 * | 2/2007 | Copeland, III | 726/25 |
| 7,203,959 | B2 * | 4/2007 | Nachenberg et al. | 726/22 |
| 7,257,742 | B2 * | 8/2007 | Fujita | 714/48 |
| 7,257,842 | B2 * | 8/2007 | Barton et al. | 726/24 |
| 7,263,616 | B1 * | 8/2007 | Brackett | 713/188 |
| 7,451,487 | B2 * | 11/2008 | Oliver et al. | 726/24 |
| 7,475,426 | B2 * | 1/2009 | Copeland, III | 726/23 |
| 7,512,980 | B2 * | 3/2009 | Copeland et al. | 726/23 |
| 7,665,140 | B2 * | 2/2010 | Oliver et al. | 726/24 |
| 7,748,038 | B2 * | 6/2010 | Olivier et al. | 726/24 |
| 7,995,584 | B2 * | 8/2011 | Eswaran et al. | 370/395.32 |
| 2002/0095601 | A1 * | 7/2002 | Hind et al. | 713/201 |
| 2004/0098599 | A1 * | 5/2004 | Bentley | 713/187 |
| 2005/0021994 | A1 * | 1/2005 | Barton et al. | 713/200 |
| 2005/0060535 | A1 * | 3/2005 | Bartas | 713/154 |
| 2006/0021031 | A1 * | 1/2006 | Leahy et al. | 726/22 |
| 2006/0053295 | A1 * | 3/2006 | Madhusudan et al. | 713/181 |
| 2006/0101269 | A1 * | 5/2006 | Moskowitz et al. | 713/176 |
| 2006/0123480 | A1 * | 6/2006 | Oh et al. | 726/23 |
| 2006/0291650 | A1 * | 12/2006 | Ananth | 380/46 |
| 2007/0028110 | A1 * | 2/2007 | Brennan | 713/176 |
| 2007/0028291 | A1 * | 2/2007 | Brennan et al. | 726/1 |
| 2007/0028302 | A1 * | 2/2007 | Brennan et al. | 726/24 |
| 2007/0028303 | A1 * | 2/2007 | Brennan | 726/24 |
| 2007/0028304 | A1 * | 2/2007 | Brennan | 726/24 |
| 2007/0240217 | A1 * | 10/2007 | Tuvell et al. | 726/24 |

(Continued)

*Primary Examiner* — Christopher Revak
(74) *Attorney, Agent, or Firm* — Straegic Patents, P.C.

(57) ABSTRACT

In embodiments of the present invention improved capabilities are described for providing a scanning of data associated with a network computer facility. In the process, a request may be received for network content from a content requesting computing facility. A source lookup associated with the request for network content may be performed, where the source lookup may be from a networked source lookup database. The requested network content may then be retrieved, where the type of the content may be determined as a further aid in scanning the content. A checksum of at least a portion of the retrieved network content may then be calculated, and a checksum lookup associated with the portion of the retrieved network content be performed, where the checksum lookup may be from a networked checksum lookup database. Finally, an action may be taken based on at least one of the source lookup and checksum lookup, where the action is associated with protecting the content requesting computing facility from malware.

25 Claims, 4 Drawing Sheets

(56) References Cited

U.S. PATENT DOCUMENTS

| | | | |
|---|---|---|---|
| 2007/0240218 A1* | 10/2007 | Tuvell et al. | 726/24 |
| 2007/0240219 A1* | 10/2007 | Tuvell et al. | 726/24 |
| 2007/0240220 A1* | 10/2007 | Tuvell et al. | 726/24 |
| 2007/0240221 A1* | 10/2007 | Tuvell et al. | 726/24 |
| 2007/0240222 A1* | 10/2007 | Tuvell et al. | 726/24 |
| 2007/0261112 A1* | 11/2007 | Todd et al. | 726/11 |
| 2007/0283440 A1* | 12/2007 | Yao et al. | 726/24 |
| 2008/0005571 A1* | 1/2008 | Moskowitz | 713/176 |
| 2008/0005572 A1* | 1/2008 | Moskowitz | 713/176 |
| 2011/0271342 A1* | 11/2011 | Chung et al. | 726/23 |
| 2011/0320816 A1* | 12/2011 | Yao et al. | 713/171 |

\* cited by examiner

NETWORK STREAM SCANNING FACILITY

BACKGROUND

1. Field

The present invention is related to computer file scanning, and more specifically relating to computer file scanning on a network device.

2. Description of the Related Art

The scanning of files on an end-point computing device, such as a client machine, is well known to the art, and may include the scanning of computer files, such as when they are stored, opened, accessed, downloaded, and the like. Scanning on an end-point computer device may be implemented in a variety ways, and may be more tolerant to potential impacts to system performance than scanning on a network device. For example, the end point computer device may have more resources to utilize to compensate with (e.g. disk space, memory, and the like) to gain better performance, and the end-point machine may be performing tasks and processes that are dedicated to a single user or single process. However, the scanning of files as they pass through a network computing device may need to be much more efficient with regard to throughput, and thus may not be able to use the same techniques utilized for the end-point computing device. File scanning at the network device level currently utilizes many of the same techniques as developed for an end-point computer. Therefore, there is a need for improved ways to scan files as they pass through a network device.

SUMMARY

The present invention provides a network device scanning facility that may provide improved throughput capabilities related to malware scanning of a file or stream of data within the constraints of a network environment, such as by utilizing efficient low-resource file analysis tools from within a network device, while simultaneously performing lookups using outside network database resources. In embodiments, the outside network database resources may provide an online look-up system that accelerates the distribution of anti-malware intelligence through a real-time system that provides quicker response to new and emerging malware campaigns.

In embodiments, the present invention may provide a scanning of data associated with a network computer facility. In the process, a request may be received for network content from a content requesting computing facility. A source lookup associated with the request for network content may be performed, where the source lookup may be from a networked source lookup database. The requested network content may then be retrieved, where the type of the content may then be determined as a further aid in scanning the content. A checksum of at least a portion of the retrieved network content may then be calculated, and a checksum lookup associated with the portion of the retrieved network content be performed, where the checksum lookup may be from a networked checksum lookup database. Finally, an action may be taken based on at least one of the source lookup and checksum lookup, wherein the action is associated with protecting the content requesting computing facility from malware. In embodiments, the action may be blocking the requested network content, sending the requested network content to the content requesting computing facility, providing further scanning of the received network content, determined by a policy, determined by the type of the requested network content, and the like. In embodiments, the source lookup database may include previously identified URLs, a white list, black list, used in subsequent scanning, and the like. In embodiments, the checksum lookup database may include checksums from previously identified network content, checksums generated from the same length of data as the portion of the retrieved network content, and the like.

In embodiments, the present invention may include a network device with on-device malware analysis tools, a network source lookup database, a network checksum lookup database, and a content requesting computing facility requesting network content in association with the network device. In embodiments, the network device may utilize lookups from both the source lookup database and the checksum lookup database in conjunction with the on-device malware analysis tools in order to take an action in association with protecting the content requesting computing facility from malware. In embodiments the action may block the requested network content, send the requested network content to the content requesting computing facility, provide further scanning of the received network content, determine a policy, determine the type of the requested network content, and the like. In embodiments, the source lookup database may include previously identified URLs, a white list, a black list, used in subsequent scanning, and the like. In embodiments, the checksum lookup database may include checksums from previously identified network content, checksums generated from the same length of data as the portion of the retrieved network content, and the like. In embodiments, the on-device malware analysis tools may include a malware scanning facility.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While the invention has been described in connection with certain preferred embodiments, other embodiments would be understood by one of ordinary skill in the art and are encompassed herein.

All documents referenced herein are hereby incorporated by reference.

DETAILED DESCRIPTION

Figure 1:
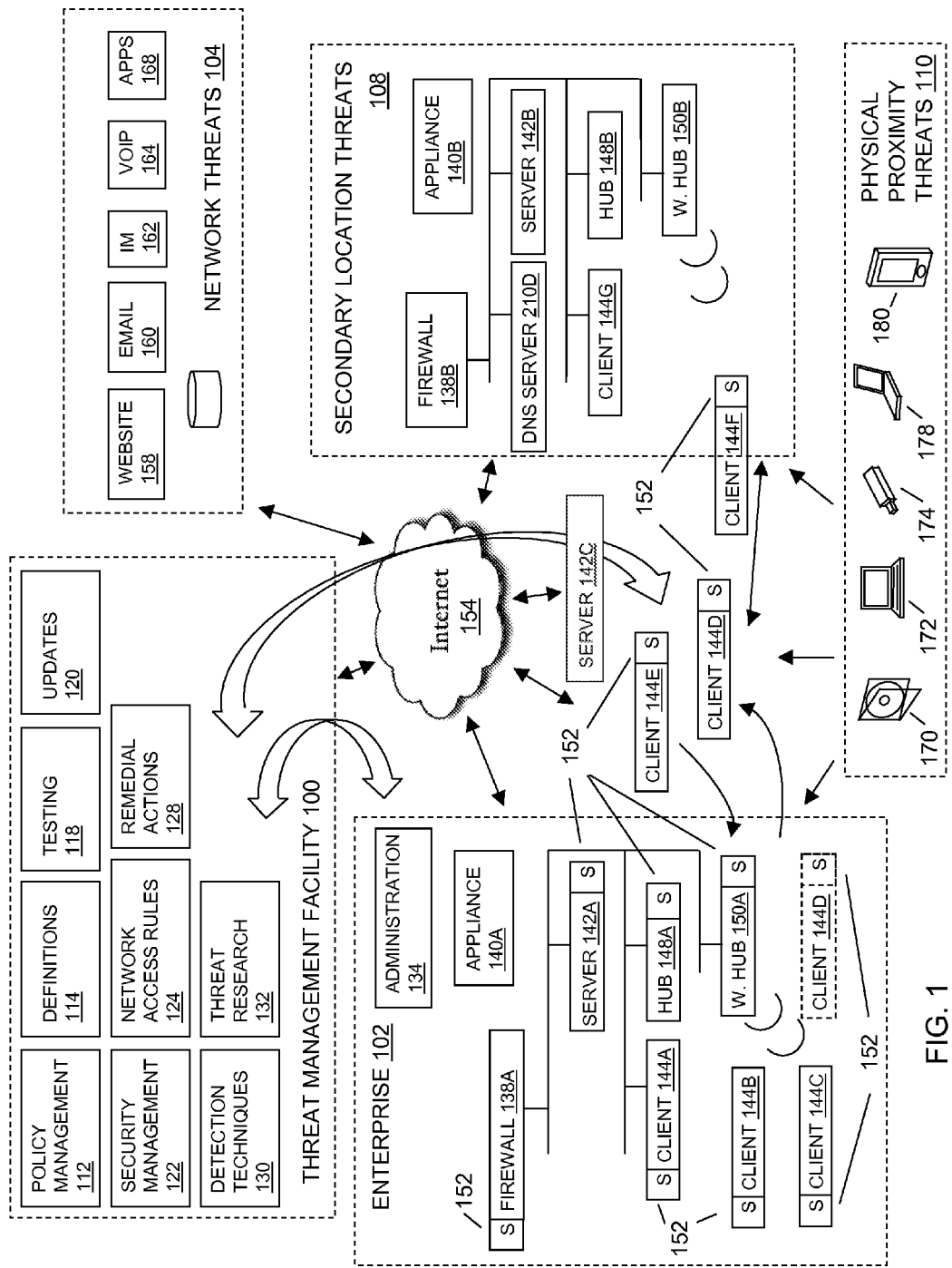
FIG. 1 depicts a block diagram of a threat management facility providing protection to an enterprise against a plurality of threats.

FIG. 1 depicts a block diagram of a threat management facility providing protection to an enterprise against a plurality of threats. An aspect of the present invention relates to corporate policy management and their implementation through a unified threat management facility 100. As will be explained in more detail below, a threat management facility 100 is used to protect computer assets from many threats, both computer generated threats and user generated threats.

The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services and policy management may be offered as one of the services. We will now turn to a description of the threat management system 100

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like.

Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112, network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The IDE definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, DNS server facility 210, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like, such as a user's desktop computer as an end-point computer, a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, DNS server facility 210, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URI filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of stream scanning embodiments. It should be understood that the following embodiments may be managed through a threat management facility 100 along with other services, such as those described herein.

The present invention provides a network stream scanning facility 212 that may provide improved throughput capabilities related to malware scanning of a file or stream of data within the constraints of a network environment, such as by utilizing efficient low-resource file analysis tools 220 from within a network device 210, while simultaneously performing lookups using outside network database resources 214, 218. In embodiments, the outside network database resources 214, 218 may provide an online look-up system that accelerates the distribution of anti-malware intelligence through a real-time system that provides quicker response to new and emerging malware campaigns. For example, the network stream scanning facility 212 may provide file analysis tools 220 on the network device itself, such as a malware threat analysis scanner, but also be able to access network information lookup facilities 214, 218 in real-time, such as a malware related URL source database 214, a malware related checksum database 218, a contextual information database, and the like. The combination of on-device analysis 220 and off-device database lookups may enable scanning to be undertaken only when a perceptible threat is present, thereby minimizing resource usage and maximizing throughput, whilst ensuring the broadest detection capabilities, which may include proactive zero-day protection. In embodiments, the combination of first performing the source lookup 218, then the checksum lookup 218, and finally performing on-device analysis, may provide the network device with greater performance for the same level of protection. In embodiments, the combination and flexibility of on-device file analysis tools 220 with real-time access to off-device network databases 214, 218 may enable the present invention to provide improved file scanning capability with greater throughput for content moving through the network device 210, while minimizing latency, software updates, memory usage, reduced CPU usage, and the like. In addition, the present invention may evolve to provide improved protection through on-the-fly outbreak analysis.

In embodiments, the network stream scanning facility 212 may also be used on an endpoint computer 144, 142, such as for URL filtering and checksum lookups as a full solution or in addition to a current desktop solution. This may be especially the case if the endpoint computer is a web server/gateway 142, where maximizing throughput is a desire.

Figure 2:
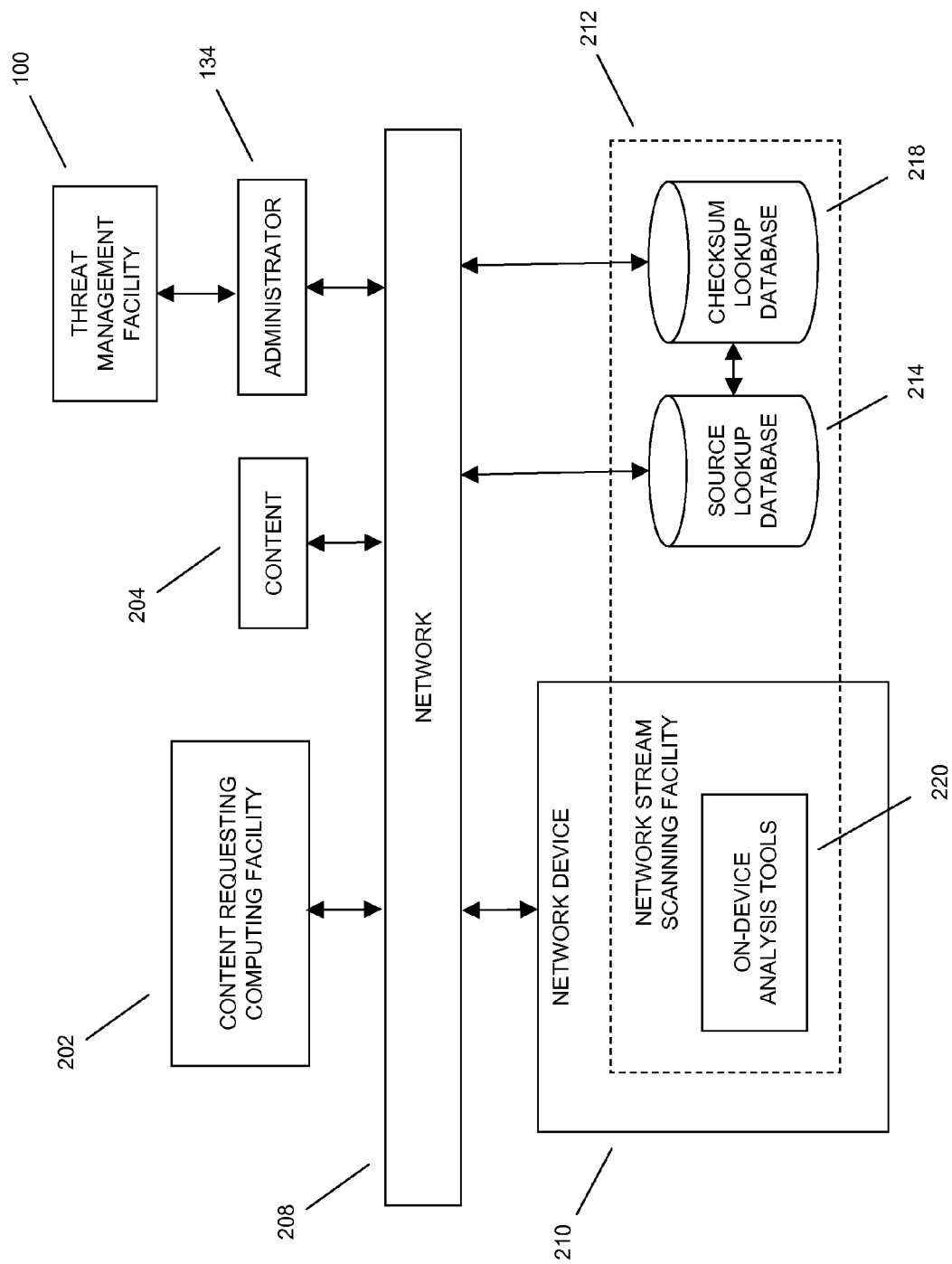
FIG. 2 depicts a block diagram of the functional components associated with the present invention.

FIG. 2 depicts a block diagram of the functional components associated with the present invention, including a content requesting computing facility 202, a content to be requested 204, a network 208, an administrator 132, a threat management facility 100, network device 210 containing on-device analysis tools 220 associated with the network stream scanning facility 212, and databases such as a source lookup database 214 and a checksum lookup database 218 associated with the network stream scanning facility 212. In embodiments, the content requesting computing facility 202 may request content 204 in association with the network device 210. The network device 210 may then utilize the network stream scanning facility 212 to provide protection against the threats associated with malware that may be associated with the content 204, such as by using a combination of the on-device analysis tools 220 and the off-device source lookup database 214 and checksum lookup database 218. If the network stream scanning facility 212 determines that the content 202 is not associated with malware, it may enable the network device 210 to communicate the content 204 to the content requesting computing facility 202. If not, then the network stream scanning facility 212 may provide an alternate action, such as to block the retrieval of the content 204, block access to the content site, alert the user of the potential that the requested content may be associated with malware, and the like. In embodiments, an administrator 134 may provide management of the network stream scanning facility 212, such as providing updates, receiving feedback from malware event detections, and the like, and may be further associated with a threat management facility 100. In addition, malware event detections associated with one database may initiate a communication with a second database, such as the information from a checksum detection in the checksum lookup database 218 for a given source URL being communicated back to the source lookup database 214.

In embodiments, the content requesting computing facility 202 may be a user acting on a client machine 144, a client machine 144 autonomously initiating a content request 302, a second network device 144 requesting a content 204, a mobile device 144B-F, a server 142, and any other networked computing facility. The network 208 may be the Internet, an intranet, a LAN, a WAN, a cell phone network, and the like. The network device 210 that is running the scan may be a server (e.g. 142A), router, application device, switch, bridge, hub (e.g. 148A), repeater, and the like. In embodiments, the network stream scanning facility 212 may provide for both on-device analysis tool 220 and off-device lookup databases 214, 218, but it should be understood that these functional components may be located in various combinations of 'on-device' and 'off-device', such as the analysis tools and databases all being resident together on the network device 210 or external to the network device 210, at least one database resident on the network device 210, at least one analysis tool on the network device and at least one analysis tool elsewhere on the network 208, and the like. In embodiments, the databases may be made available to the network device 210 as a part of the network stream scanning facility 212 as a real-time service, where the databases may be updated constantly.

Figure 3:
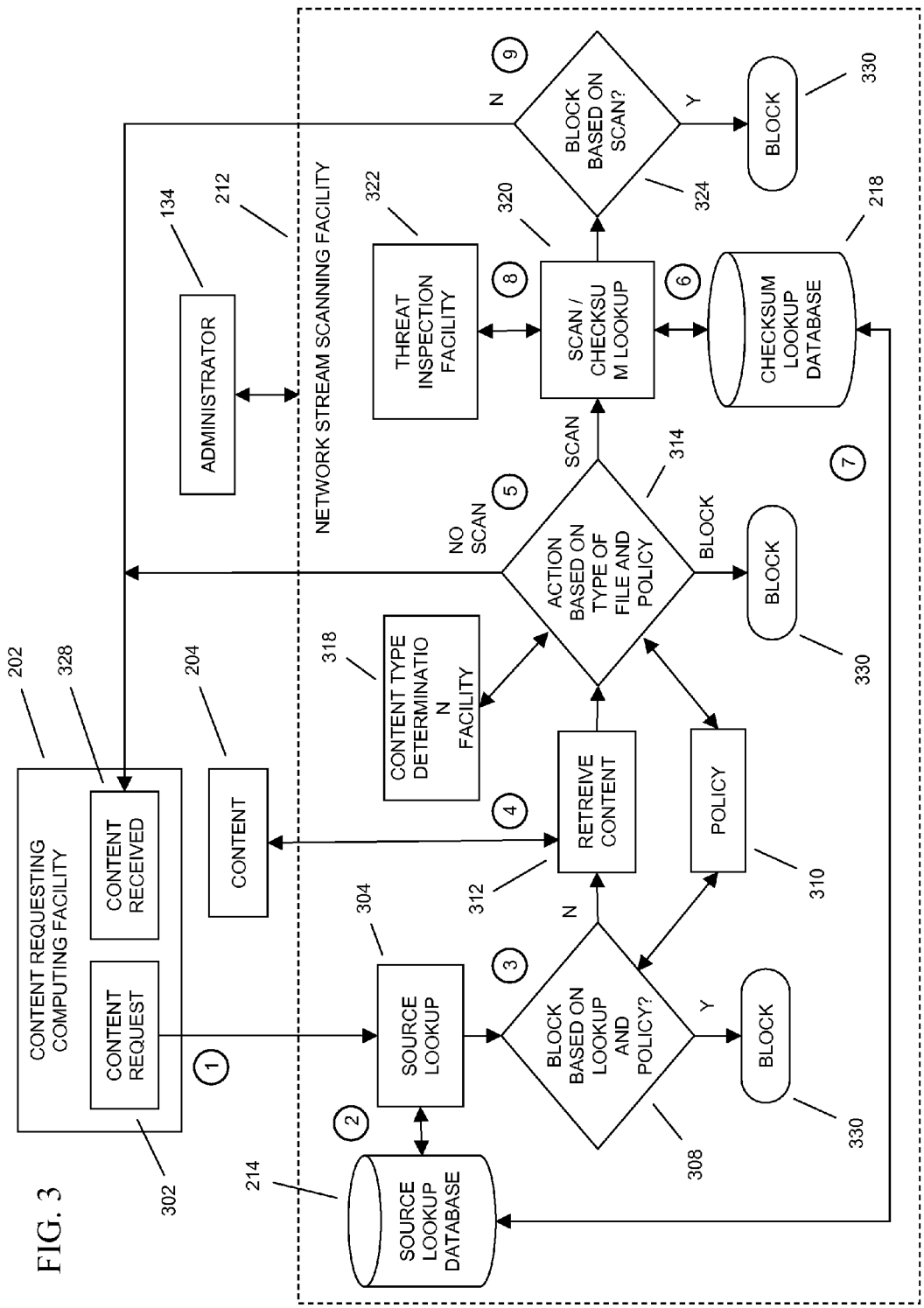
FIG. 3 depicts a detailed process flow diagram in an embodiment of the present invention.

FIG. 3 depicts a process flow diagram in an embodiment of the present invention. In embodiments, content being transferred in association with a network device 210 may be initiated for transfer by the content requesting computing facility 202. In a step (1), the content may be requested 302 in association with the network device 210, where the network device 210 provides protection from the threats of malware by utilizing the network stream scanning facility 212. In a step (2) the network stream scanning facility 212 may provide a source lookup 304, such as accessing the source lookup database 214 for URLs that have been previously associated with malware. In a step (3) the network stream scanning facility 212 may take an action 308 based on the results of the source lookup 304 as well as based on a policy 310. For example, the source lookup 304 may detect that the requested URL is known to be associated with malware, and the policy 310 may be to block 330 the content request in this instance. Alternatively, the policy may communicate an alert to the content requesting computing facility 202 rather than providing automatic blocking. In embodiments, a source lookup 304 may indicate any one of a plurality of conditions associated with the requested content, such as indicating that the source URL is unknown, good, included in a white list, to be trusted, identified as bad, included in a black list, suspicious, included in a grey list, and the like. In addition, the identification associated with the source lookup 304 may affect subsequent content scanning. For example, a URL that has been identified as 'good' may be trusted and content scanning may be bypassed or reduced in scope, an 'unknown' URL may trigger an intermediate level of content scanning, a white listed URL may result in scanning being bypassed all together, and the like. In embodiments, policy 310 may be determined by the administrator 134, such as being a part of an enterprise administration of the network stream scanning facility 212, being in association with the threat management facility 100, and the like.

Continuing to refer to FIG. 3, a step (4) may be the network stream scanning facility 212 enabling the network device 210 to retrieve the content 312, such as in the case where the source lookup 304 revealed no detection of malware in association with the source lookup. In a step (5) the network stream scanning facility 212 may determine the type of content retrieved 318, such as through a true file type (TFT). Besides giving a text representation of the file format, TFT may also provide a threat level, such as low, medium, high, and the like, and reflect the potential for a file of that particular file type to cause damage. In embodiments, the threat level may help determine what action to take. For example, an executable may always be passed for further scanning, where an image file may be communicated directly to the content requesting computing facility 202 without scanning. In addition, policy 310 may determine that certain file types get blocked 330, such as content that is not allowed based on company policy.

In the case where further scanning 320 is called for, a step (6) may generate a checksum for a portion of the file and provide the checksum for a checksum lookup through the checksum lookup database 216. In embodiments, check-summing may provide a light-weight process for scanning streamed data. In embodiments, the checksum lookup database 218 may provide for a database of checksums for content that has been found to be associated with malware. In the case where a checksum is found to match the retrieved content, the checksum lookup database 218 may communicate this information back to the source lookup database 214, such as to add the URL associated with the retrieved content to the source lookup database 214. In embodiments, only a small fraction of the files may need to be checksummed as part of the network stream scanning facility's 212 process. In some instances the network stream scanning facility 212 may provide for a step (8) where further scanning of the content is provided through a threat inspection facility 322, such a for unknown websites. For example, scanning through the threat inspection facility may include scanning of a portion of the content file through identities to inspect the files, analyzing the header of files for suspicious traits, and various other anti-malware scanning techniques known to the art. In embodiments, the threat inspection facility 212 may provide scanning in parallel with other processes, such as checksum generation and lookup. Finally, a step (9) may provide a decision 324 as to whether to allow or block 330 the content 204 from being communicated to the content requesting computing facility 202 based on the results of the checksum lookup 320 and any further scanning by the threat inspection facility 322. In embodiments, the network stream scanning facility's 212 use of both a source lookup 304 before the retrieval of content 312 and a checksum lookup 320 after the retrieval of content 312 may provide the present invention with significant improvements associated with the detection of malware, while providing a minimum impact to the throughput and resources of the network device 210.

In embodiments, the network stream scanning facility 212 may improve performance of detecting malware in streams of data associated with a network device 210. For example, http 'get requests' may be filtered using database lookups to determine the reputation of that URL, and the like. If the http 'get request' passes, the response may also be 'scanned' by checksumming the http response and using database lookups to determine if that checksum is in a malware blacklist. This combination of lookups on the 'get' and 'response' may provide a significant improvement in malware detection, where the URL reputation filter may significantly reduce the amount of check-summing that would need to take place otherwise. In embodiments, check-summing, or other stream scanning techniques such as handling, that are currently used in isolation, may not be good at detecting certain types of malware such as a traditional virus or obfuscated scripts. But through the combination of these techniques, a diversity of malware threats may be handled without causing undue burden to the performance of the network device. In embodiments, the URL lookup may also greatly reduce the exposure to malware threats by tracking and blocking the websites that host such malware. The URL reputation data may block 'day 0' threats, such as when particular sites are commonly used to host malware, and where other techniques which scan the stream on their own may not.

In embodiments, various aspects of the present invention may combine to provide the network device 210 with improved system performance while implementing a malware protection function. For one, the use of network lookup databases 214, 218 may provide an important aspect of the present invention, as the large, often changing database, does not need to be downloaded to the low resource network device. Another important aspect may be passing the response to the source lookup 214 to the scanner, where it could be blocked, allowed, determined to be unknown, or determined to be some other level of suspiciousness. And still another is using the network lookup databases 214, 218 to do the signature lookup in a fast and efficient manner, especially when complemented with a source lookup 214 beforehand. The present invention may provide for improved malware threat protection to a network device 210, without sacrificing network device system performance, through combining of the various aspects of detection discussed herein in a layered and selective manner, providing multiple opportunities in the process for the inclusion of policy 310 to determine the need to proceed to later protective layers.

Figure 4:
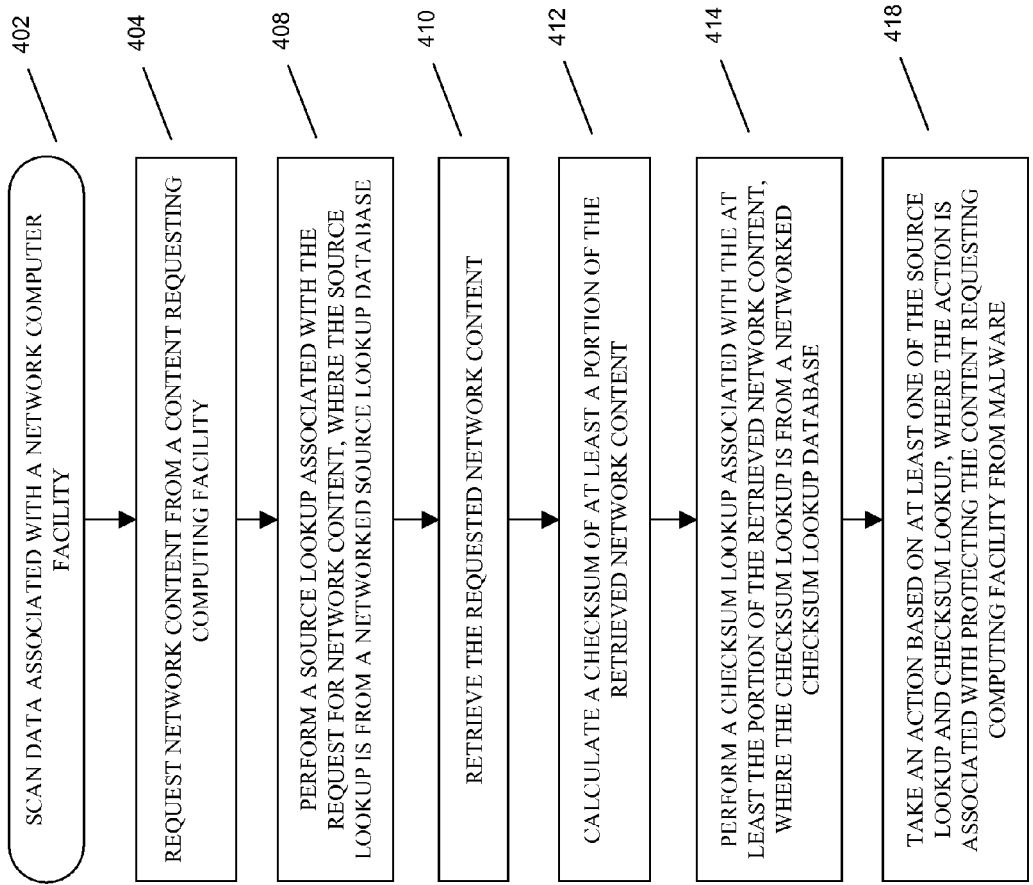
FIG. 4 depicts a process flow diagram for an embodiment of the present invention.

Referring to FIG. 4, in embodiments, the present invention may provide a scanning of data associated with a network computer facility 402. In the process, a request may be received for network content from a content requesting computing facility 404. A source lookup associated with the request for network content may be performed, where the source lookup may be from a networked source lookup database 408. The requested network content may then be retrieved 410, where the type of the content may then be determined as a further aid in scanning the content. A checksum of at least a portion of the retrieved network content may then be calculated 412, and a checksum lookup associated with the portion of the retrieved network content be performed, where the checksum lookup may be from a networked checksum lookup database 414. Finally, an action may be taken based on at least one of the source lookup and checksum lookup, wherein the action is associated with protecting the content requesting computing facility from malware 418. In embodiments, the action may be blocking the requested network content, sending the requested network content to the content requesting computing facility, providing further scanning of the received network content, determined by a policy, determined by the type of the requested network content, and the like. In embodiments, the source lookup database may include previously identified URLs, a white list, black list, used in subsequent scanning, and the like. In embodiments, the checksum lookup database may include checksums from previously identified network content, checksums generated from the same length of data as the portion of the retrieved network content, and the like.

In embodiments, the present invention may include a network device with on-device malware analysis tools, a network source lookup database, a network checksum lookup database, and a content requesting computing facility requesting network content in association with the network device. In embodiments, the network device may utilize lookups from both the source lookup database and the checksum lookup database in conjunction with the on-device malware analysis tools in order to take an action in association with protecting the content requesting computing facility from malware. In embodiments the action may block the requested network content, send the requested network content to the content requesting computing facility, provide further scanning of the received network content, determine a policy, determine the type of the requested network content, and the like. In embodiments, the source lookup database may include previously identified URLs, a white list, a black list, used in subsequent scanning, and the like. In embodiments, the checksum lookup database may include checksums from previously identified network content, checksums generated from the same length of data as the portion of the retrieved network content, and the like. In embodiments, the on-device malware analysis tools may include a malware scanning facility.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of scanning data comprising:
receiving a request for network content at a scanning facility, the request received from a content requesting computing facility remote from the scanning facility, and the request including a source from which to retrieve the network content;
performing a source lookup for the request at the scanning facility, wherein the source lookup requests data concerning the source of the request from a networked source lookup database, and wherein the networked source lookup database responds with a characterization of the source;
retrieving the network content to the scanning facility;
calculating a checksum of the network content;
performing a checksum lookup on the checksum, wherein the checksum lookup is from a networked checksum lookup database that stores checksums for known malware content; and
when the network content is not identified as malware based upon the checksum lookup, taking an action to protect the content requesting computing facility from malware based on the characterization of the source from the networked source lookup database.

2. The method of claim 1, wherein the action is blocking the requested network content.

3. The method of claim 1, wherein the action is sending the requested network content to the content requesting computing facility.

4. The method of claim 1, wherein the action is providing further scanning of the received network content, wherein the further scanning depends on the characterization of the network content.

5. The method of claim 1, wherein the action is determined by a policy.

6. The method of claim 1, wherein the action is determined by a type of the requested network content.

7. The method of claim 1, wherein the networked source lookup database includes a plurality of characterizations of a plurality of previously identified URLs.

8. The method of claim 1, wherein the networked source lookup database includes a white list of URLs that are acceptable to access.

9. The method of claim 1, wherein the networked source lookup database includes a black list of URLs that are unacceptable to access.

10. The method of claim 1, wherein the result of the source lookup is used in subsequent scanning.

11. The method of claim 1, further comprising updating the networked source database when a scan of the networked source lookup database with the source of the network content when a scan of the network content identifies malware.

12. The method of claim 1, wherein the networked checksum lookup database includes checksums generated from the same length of data as the network content.

13. A system comprising:
a network device with on-device malware analysis tools;
a networked source lookup database storing a characterization of a number of URLs, the networked source lookup database configured to respond to a source URL with a corresponding characterization of the source URL;
a networked checksum lookup database storing checksums for known malware content, the networked checksum lookup database configured to respond to a checksum with any malware known to be associated with the checksum; and
a content requesting computing facility configured to request network content through the network device, wherein the network device is configured to protect the content requesting computing facility from malware by sequentially performing a first query of the networked source lookup database and a second query of the networked checksum lookup database, and further configured to conditionally take action according to a result of the first query and the second query.

14. The system of claim 13, wherein the action is blocking the requested network content.

15. The system of claim 13, wherein the action is sending the requested network content to the content requesting computing facility.

16. The system of claim 13, wherein the action is providing further scanning of the received network content.

17. The system of claim 13, wherein the action is determined by a policy.

18. The system of claim 13, wherein the action is determined by the type of the requested network content.

19. The system of claim 13, wherein the networked source lookup database includes a characterization of previously identified URLs.

20. The system of claim 13, wherein the networked source lookup database includes a white list of URLs that are acceptable to access.

21. The system of claim 13, wherein the networked source lookup database includes a black list of URLs that are unacceptable to access.

22. The system of claim 13, wherein a result of the first query is used in subsequent scanning 23. The system of claim 13, wherein the networked checksum lookup database includes checksums from prior network content identified to contain malware.

24. The system of claim 13, wherein the networked checksum lookup database includes checksums generated from the same length of data as the network content.

25. The system of claim 13, wherein the on-device malware analysis tools include a malware scanning facility.

* * * * *